US 9,057,301 B2

(12) United States Patent
Devarakonda (10) Patent No.: US 9,057,301 B2
(45) Date of Patent: Jun. 16, 2015

(54) EMISSIONS CONTROL IN STATIONARY RICH BURN ENGINES

(71) Applicant: General Electric Company, Schenectady, NY (US)

(72) Inventor: Maruthi N. Devarakonda, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 13/933,766

(22) Filed: Jul. 2, 2013

(65) Prior Publication Data

US 2015/0010449 A1    Jan. 8, 2015

(51) Int. Cl.
| G01M 15/10 | (2006.01) |
| F01N 3/10 | (2006.01) |
| F01N 3/22 | (2006.01) |
| F01N 3/30 | (2006.01) |
| B01D 53/94 | (2006.01) |

(52) U.S. Cl.
CPC ............... *F01N 3/108* (2013.01); *F01N 3/101* (2013.01); *F01N 3/225* (2013.01); *F01N 3/30* (2013.01); F01N 2550/14 (2013.01); F01N 2560/025 (2013.01); F01N 2560/026 (2013.01); F01N 2570/18 (2013.01); F01N 2900/0601 (2013.01); F01N 2900/1616 (2013.01); *B01D 53/9495* (2013.01)

(58) Field of Classification Search
CPC .. G01M 15/10; G01M 15/102; G01M 15/104
USPC ................... 73/23.31, 23.32, 114.69, 114.71, 73/114.72, 114.73, 114.75
See application file for complete search history.

(56) References Cited

U.S. PATENT DOCUMENTS

| 5,706,653 | A | 1/1998 | Shoji et al. |
| 2010/0037592 | A1 | 2/2010 | Brandt et al. |
| 2011/0182791 | A1* | 7/2011 | Fedeyko et al. ............... 423/237 |
| 2014/0260213 | A1* | 9/2014 | Devarakonda .................. 60/299 |

FOREIGN PATENT DOCUMENTS

| EP | 2392791 A1 | 12/2011 |
| JP | 08312337 A | 11/1996 |
| WO | 2008036908 A2 | 3/2008 |
| WO | 2012137050 A1 | 10/2012 |

OTHER PUBLICATIONS

European Search Report and Opinion issued in connection with corresponding EP Application No. 14175159.4 on Dec. 5, 2014.

* cited by examiner

*Primary Examiner* — Eric S McCall
(74) *Attorney, Agent, or Firm* — Ernest G. Cusick; Frank A. Landgraff (57) ABSTRACT

A catalyst system may include a three-way catalyst that receives exhaust gases from an engine and an ammonia slip catalyst that receives exhaust gases from the three-way catalyst. An air injection component can be configured between the three-way catalyst and the ammonia slip catalyst. A first sensor can determine first exhaust gases data and transmits that data to a controller, while a second sensor can determine second exhaust gases data and transmit that data to a controller. The controller can estimate unmeasured exhaust gases data based on the data received from the sensors and determine a setting of a component of the system and/or of the engine based on the unmeasured exhaust gases data.

20 Claims, 4 Drawing Sheets

EMISSIONS CONTROL IN STATIONARY RICH BURN ENGINES

TECHNICAL FIELD

The present disclosure relates to emissions controls for internal combustion engines generally and in particular to methods and systems for emissions control in stationary rich burn engines.

BACKGROUND

Internal combustion engines are ideally operated in a way that the combustion mixture contains air and fuel in the exact relative proportions required for a stoichiometric combustion reaction (i.e., where the fuel is burned completely.) A rich-burn engine may operate with a stoichiometric amount of fuel or a slight excess of fuel, while a lean-burn engine operates with an excess of oxygen ($O_2$) compared to the amount required for stoichiometric combustion. The operation of an internal combustion engine in lean mode may reduce throttling losses and may take advantage of higher compression ratios, thereby providing improvements in performance and efficiency. Rich burn engines may have the benefits of being relatively simple, reliable, stable, and adapting well to changing loads. Rich burn engines may also have lower nitrogen oxide emissions, but at the expense of increased emissions of other compounds.

In order to comply with emissions standards, many rich burn internal combustion engines utilize catalysts, such as non-selective catalytic reduction (NSCR) subsystems (commonly known as three-way catalysts). Catalysts may reduce emissions of the nitrogen oxides NO and $NO_2$ (collectively NOx), carbon monoxide (CO), ammonia ($NH_3$), methane ($CH_4$), other volatile organic compounds (VOC), and other compounds and emissions components by converting such emissions components to less toxic substances. This conversion is performed in a catalyst component using catalyzed chemical reactions. Catalysts can have high reduction efficiencies and can provide an economical means of meeting emissions standards (often expressed in terms of grams of emissions per brake horsepower hour (g/bhp-hr)). Separate catalyst components or devices may be included in the exhaust pathway of a rich burn engine to convert different emissions components. For example, one catalyst component may convert carbon monoxide and NOx while another may convert ammonia and methane.

In the oxidation process, the resulting substances generated by a catalyst component may require further conversion by a subsequent catalyst. For example, a catalyst component may convert NOx generated by an engine into ammonia, which may then be converted by another catalyst component. In a rich burn engine, controlling carbon monoxide and NOx emissions poses many challenges, one of which is operating the engine within an operating window of air/fuel proportions that allows the catalyst components to perform optimally, reducing emissions to the maximum extent possible. The air/fuel proportion window for optimal performance of natural gas engines is relatively narrow, thus hindering the ability to operate the engine at a richer burn that would reduce NOx emissions. Moreover, operating such an engine within a desired operating window can require many components and regular calibrations, thus making such an engine costly to maintain.

BRIEF DESCRIPTION OF THE INVENTION

In an exemplary non-limiting embodiment, a catalyst system may include a three-way catalyst that receives first exhaust gases from an engine, an ammonia slip catalyst that receives second exhaust gases from the three-way catalyst, and an air injection component configured between the three-way catalyst and the ammonia slip catalyst. A first sensor may determine first exhaust gases data and transmit the first exhaust gases data to a controller. A second sensor may determine second exhaust gases data and transmit the second exhaust gases data to the controller. The controller may estimate unmeasured exhaust gases data based on the first exhaust gases data and the second exhaust gases data and determine a setting of a component of the engine or the catalyst system based on the unmeasured exhaust gases data.

In another exemplary non-limiting embodiment, a method is disclosed for receiving first exhaust gases from an engine at a three-way catalyst, and receiving second exhaust gases from the three-way catalyst at an ammonia slip catalyst. First exhaust gases data may be determined at a first sensor and transmitted to a controller. Second exhaust gases data may be determined at a second controller and transmitted to the controller. The controller may determine unmeasured exhaust gases data based on the first exhaust gases data and the second exhaust gases data. The controller may further determine a setting for a catalyst component or an engine component based on the unmeasured exhaust gases data.

In another exemplary non-limiting embodiment, an engine may include an internal combustion component that generates first exhaust gases, a three-way catalyst that receives the first exhaust gases from the internal combustion component, an ammonia slip catalyst that receives second exhaust gases from the three-way catalyst, and an air injection component configured between the three-way catalyst and the ammonia slip catalyst. A first sensor may determine first exhaust gases data and transmits the first exhaust gases data to a controller. A second sensor may determine second exhaust gases data and transmits the second exhaust gases data to the controller. The controller may estimate unmeasured exhaust gases data based on the first exhaust gases data and the second exhaust gases data and determine a setting of a component of the engine based on the unmeasured exhaust gases data.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein.

DETAILED DESCRIPTION OF THE INVENTION

Figure 1:
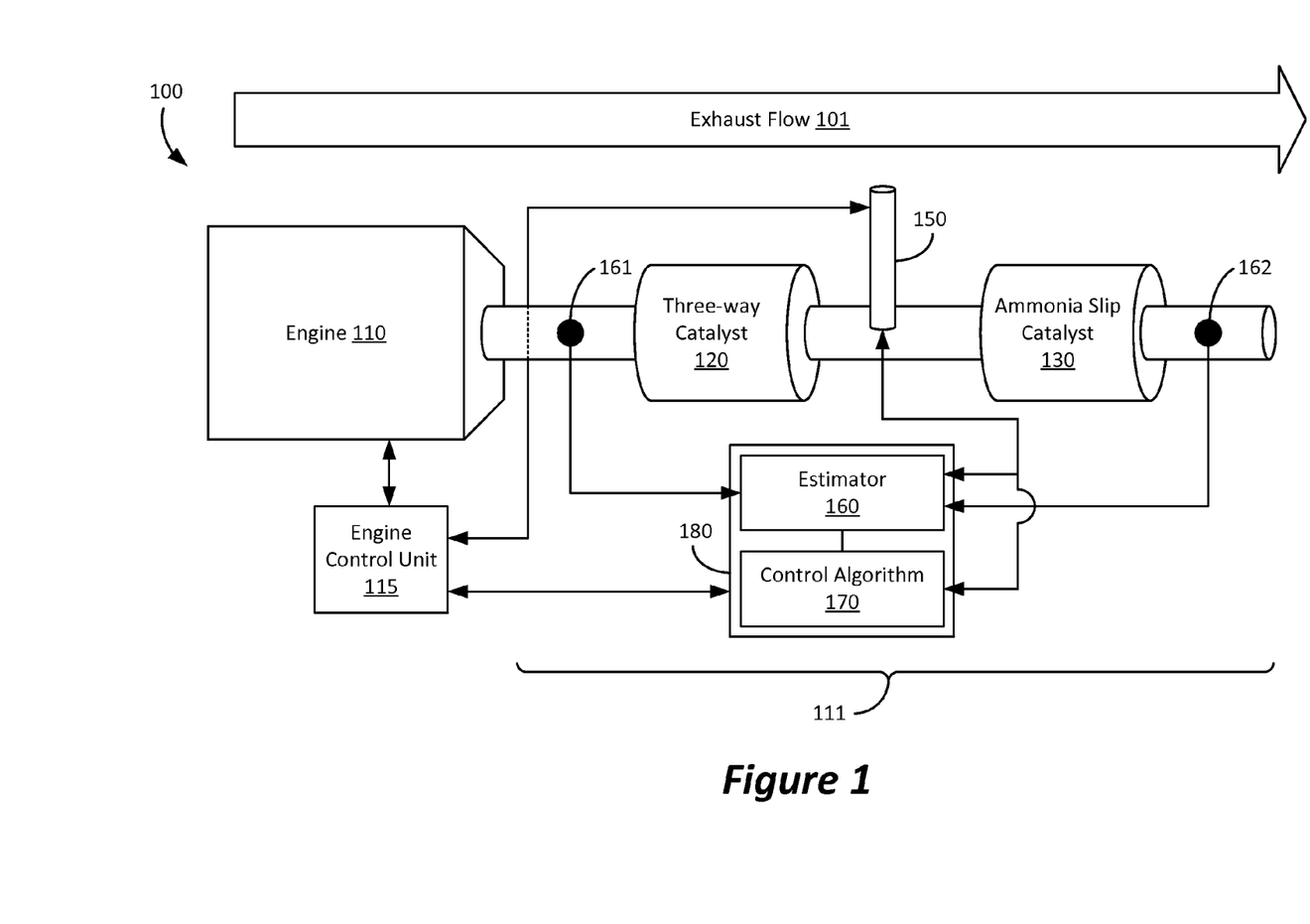
FIG. 1 is a block diagram of a non-limiting exemplary rich-burn engine and catalyst system.

FIG. 1 illustrates exemplary system 100, including engine 110 and catalyst system 111, that may be implemented according to an embodiment. Note that the entire system 100 may also be referred to as an "engine". System 100 as illustrated is a simplified block diagram that will be used to explain the concepts disclosed herein, and therefore is not to be construed as setting forth any physical requirements or particular configuration required for any embodiment disclosed herein. All components, devices, systems and methods described herein may be implemented with number of components of any shape, form, or type, and any combination of any such components that are capable of implementing the disclosed embodiments are contemplated as within the scope of the present disclosure.

Engine 110 may be any type of internal combustion engine or any device, component, or system that includes an internal combustion component that generates exhaust gases. In an embodiment, engine 110 may be a natural gas fueled internal combustion engine configured to operate with a stoichiometric amount of fuel or a slight excess of fuel in proportion to oxygen (i.e., rich). Catalyst system 111 may include three-way catalyst 120 and ammonia slip catalyst 130. Engine 110 may exhaust gases through catalyst system 111 in the direction indicated by exhaust flow 101, i.e., from engine 110 into three-way catalyst 120 and from three-way catalyst 120 into ammonia slip catalyst 130 until gases are ultimately exhausted from ammonia slip catalyst 130. Each of catalysts 120 and 130 may convert received exhaust gases to converted exhaust gases as described herein.

Engine control unit 115 may control engine 110 and any components of engine 110, including components such as a stepper motor or a fuel control valve that controls the air-fuel ratio of air and fuel being used by engine 110. Engine control unit 115 may also control mid-bed air injection component 150 (discussed in more detail herein) and/or an actuator of mid-bed air injection component 150 in order to control the injection of air into catalyst system 111, and may receive data from mid-bed air injection component 150, such as flow rate, temperature, and pressure data. In some embodiments, mid-bed air injection component 150 may obtain or determine such data by communicating, or otherwise operating in conjunction, with thermocouples and/or delta pressure sensors configured in catalyst system 111. Alternatively, engine control unit 115 may obtain or determine flow rate, temperature, and pressure data for catalyst system 111 or exhaust gases directed thereto by operating directly with thermocouples and/or delta pressure sensors configured in catalyst system 111, or by using any other means that may provide or determine such data. Engine control unit 115 may determine, acquire, or otherwise obtain and may transmit or otherwise provide data such as flow rate, temperature, and pressure data for catalyst system 111 or exhaust gases directed thereto to controller 180 or components thereof (discussed in more detail below). All such embodiments are contemplated as within the scope of the present disclosure.

In an embodiment, engine 110 is a rich burn engine exhausting gases into three-way catalyst 120. In this embodiment, three-way catalyst 120 may be a non-selective catalytic reduction (NSCR) subsystem, commonly referred to as a three-way catalyst. Three-way catalyst 120 may reduce CO and hydrocarbon emissions using an oxidation process, while also reducing NOx emissions using a reduction process.

Gases exhausted into three-way catalyst 120 by engine 110 may include NOx, carbon monoxide, and ammonia. Three-way catalyst 120 may convert some or all of the NOx that enters three-way catalyst 120 into ammonia. These generated compounds may be converted to other compounds using additional catalyst system components, as described herein. While some exhaust components entering three-way catalyst 120, such as carbon monoxide and ammonia, may be converted into other compounds by three-way catalyst 120, at least some of these compounds may not be converted to another compound by three-way catalyst 120 and may be exhausted from three-way catalyst 120 into ammonia slip catalyst 130.

Ammonia slip catalyst 130 may be an ammonia slip catalyst that may address ammonia that is emitted from three-way catalyst 120 unreacted. In an embodiment, ammonia slip catalyst 130 may be a dual layer catalyst with low precious metal loading and a zeolite coating. In such embodiments, a dual layer catalyst may be configured with two catalysts, each performing different functions. Each of the catalysts may be coated or otherwise configured on the same substrate. For example, in an embodiment, ammonia slip catalyst 130 may have a precious metal loading and a zeolite coating on a same substrate. The precious metal loading used in ammonia slip catalyst 130 may be a lower loading than a typical diesel oxidation catalyst and/or a typical three-way catalyst. Ammonia slip catalyst 130 may oxidize the ammonia and carbon monoxide received from three-way catalyst 120 to dinitrogen ($N_2$, commonly referred to as simply "nitrogen") and carbon dioxide ($CO_2$), respectively. In an embodiment, air may be added into the exhaust flow between three-way catalyst 120 and ammonia slip catalyst 130 by injecting air into the flow with mid-bed air injection component 150. This added air may improve and/or assist in the oxidation processes performed at ammonia slip catalyst 130. Mid-bed air injection component 150 may be any means, component, device, or combination thereof capable of introducing additional air into the exhaust stream, and all such embodiments are contemplated as within the scope of the present disclosure.

Catalyst system 111 may be configured with controller 180 having at least two components, estimator 160 and control algorithm 170. Note that estimator 160 and control algorithm 170 may be combined, for example, as portions of a single software module or component, or may be separately implemented in separate software and/or hardware components. Controller 180 may be any type and any number of computing devices, software modules, or any combination thereof, and may be implemented by a device dedicated to performing the functions of a controller as described herein or by a device that performs other additional functions. All such embodiments are contemplated as within the scope of the present disclosure.

Estimator 160 may receive, using any means, including wireless communications, wired communications, or any combination thereof, measurements of particular gases or other substances from various sensors that may be configured at various points in catalyst system 111. Estimator 160 may also receive other data, such as flow rate, temperature, and pressure data for catalyst system 111 or exhaust gases directed thereto, from other components of system 100, such as engine control unit 115. Estimator 160 may exercise models of catalysts to determine estimates of catalyst system states and gas contents that are not directly measured. For example, estimator 160 may exercise a model of a three-way catalyst and an ammonia slip catalyst configured similar to the particular configuration of three-way catalyst 120 and ammonia slip catalyst 130 to determine estimates of gases such as CO, $NH_3$, and $O_2$ at points in catalyst system 111 where direct measurements are not made, such as at the point between three-way catalyst 120 and ammonia slip catalyst 130. In another example, estimator 160 may estimate key species (e.g., CO, NOx, $NH_3$ and $CH_4$) concentrations at various points in catalyst system 111 (e.g., before gasses enter three-way catalyst 120) based on data received from engine control unit 115 using maps and/or correlations.

Estimator 160 may provide such estimates to control algorithm 170 that may then determine adjustments for components of catalyst system 111 and/or engine 110. For example, control algorithm 170 may determine an adjustment for the air-fuel ratio to be used at engine 110 and/or an adjustment of air injection to be used at mid-bed air injection component 150. Any adjustments or instructions to perform adjustments, or current determined settings, may then be transmitted or otherwise provided to engine control unit 115 for application to engine 110.

$O_2$ sensor 161 may be configured to detect and/or determine measurements of $O_2$ from exhaust gases entering three-way catalyst 120. $O_2$ sensor 161 may be configured to provide or otherwise transmit this data, directly or indirectly, to controller 180 and/or estimator 160. NOx sensor 162 may be configured to detect and/or determine measurements of NOx and/or $NH_3$ from exhaust gases exiting ammonia slip catalyst 130.

Estimator 160 may obtain other operating condition data, such as flow rate, temperature, and pressure data, from engine control unit 115, indirectly or directly from mid-bed air injection component 150, and/or indirectly or directly from other components of engine 110 and/or catalyst system 111, such as thermocouples and delta pressure sensors. Estimator 160 may take the measurements received from $O_2$ sensor 161 and NOx sensor 162 in combination with any other operating condition data and estimate, by exercising models representing similar catalysts, the quantity and/or concentration of CO and/or $NH_3$ in the gases entering three-way catalyst 120, the storage of $O_2$ in three-way catalyst 120, the storage of $NH_3$ in ammonia slip catalyst 130, the quantity and/or concentration of CO, $NH_3$, and/or $O_2$ in the gases between three-way catalyst 120 and ammonia slip catalyst 130, and/or the quantity and/or concentration of CO, $NH_3$, and/or $O_2$ in the gases exiting ammonia slip catalyst 130. Estimator 160 may also, or instead, estimate the storage of any gases or substances within any catalyst and/or estimate the quantities and/or concentrations of any other gases or any other substances that may be present anywhere in catalyst system 111, regardless of whether such gases or substances are directly measured by sensors or using any other means. All such embodiments are contemplated as within the scope of the present disclosure.

Estimator 160 may provide the estimated values based on sensor data received from $O_2$ sensor 161 and NOx sensor 162 to control algorithm 170 that may then determine whether adjustments are needed to improve the operation of catalyst system 111 and/or engine 110, and/or determine the proper current operating settings for components of catalyst system 111 and/or engine 110. For example, control algorithm 170 may determine a proper current setting for a stepper motor or a fuel control valve that controls the air-fuel ratio for engine 110 based on the estimates provided by estimator 160. Controller 180 may transmit this setting to engine control unit 115 so that engine control unit 115 can adjust a stepper motor of engine 110. Alternatively, controller 180 may transmit this setting directly to the stepper motor or the fuel control valve of engine 110 or transmit a command that will cause the stepper motor of engine 110 to operate at the determined setting. Similarly, control algorithm 170 may determine a proper current setting for an actuator of mid-bed air injection component 150 based on the estimates provided by estimator 160. Controller 180 may transmit this setting to engine control unit 115 so that engine control unit 115 can the actuator of mid-bed air injection component 150. Alternatively, controller 180 may transmit this setting directly to the actuator of mid-bed air injection component 150 or transmit a command that will cause the actuator of mid-bed air injection component 150 to operate at the determined setting. Any other adjustments or settings of any other components or engine 110 and/or catalyst system 111, or any other commands to implement such adjustments or settings, are contemplated as within the scope of the present disclosure.

Figure 2:
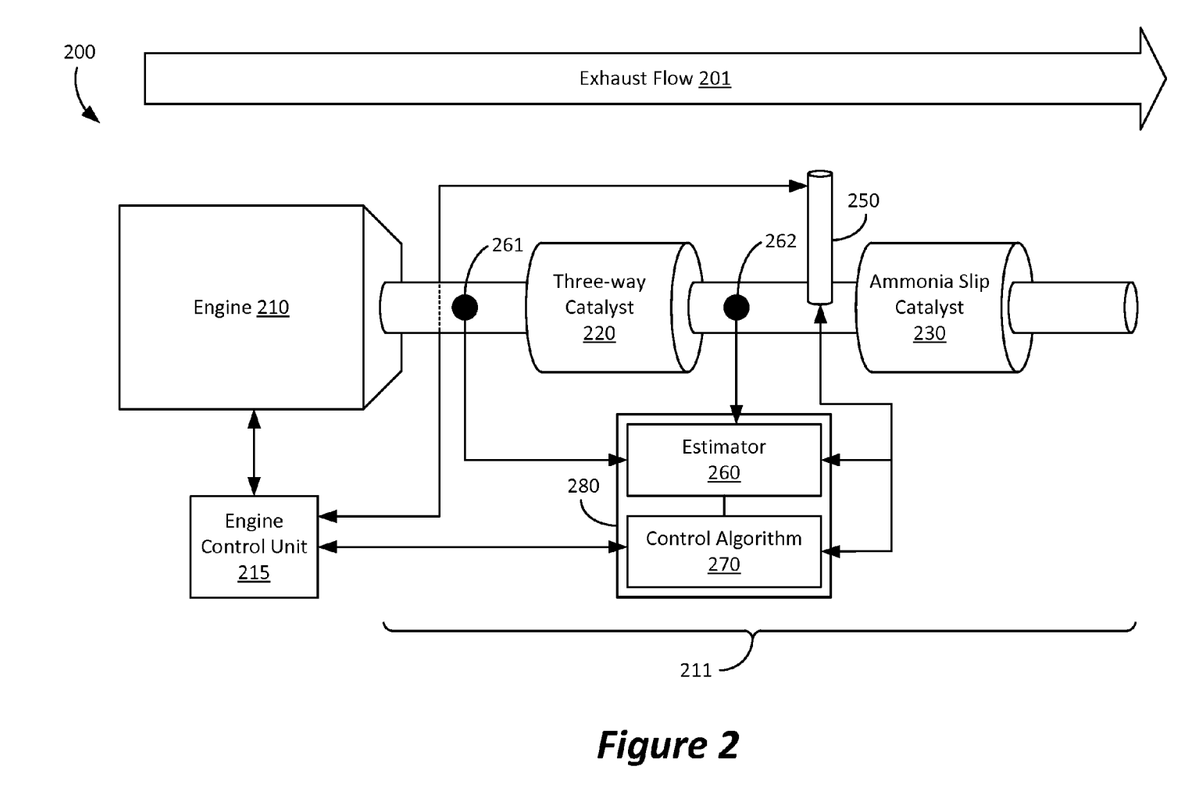
FIG. 2 is a block diagram of another non-limiting exemplary rich-burn engine and catalyst system.

FIG. 2 illustrates exemplary system 200, including engine 210 and catalyst system 211, that may be implemented according to another embodiment. Note that the entire system 200 may also be referred to as an "engine". System 200 as illustrated is a simplified block diagram that will be used to explain the concepts disclosed herein, and therefore is not to be construed as setting forth any physical requirements or particular configuration required for any embodiment disclosed herein. All components, devices, systems and methods described herein may be implemented with number of components of any shape, form, or type, and any combination of any such components that are capable of implementing the disclosed embodiments are contemplated as within the scope of the present disclosure.

Engine 210 may be any type of internal combustion engine or any device, component, or system that includes an internal combustion component that generates exhaust gases. In an embodiment, engine 210 may be a natural gas fueled internal combustion engine configured to operate with a stoichiometric amount of fuel or a slight excess of fuel in proportion to oxygen (i.e., rich). Catalyst system 211 may include three-way catalyst 220 and ammonia slip catalyst 230. Engine 210 may exhaust gases through catalyst system 211 in the direction indicated by exhaust flow 201, i.e., from engine 210 into three-way catalyst 220 and from three-way catalyst 220 into ammonia slip catalyst 230 until gases are ultimately exhausted from ammonia slip catalyst 230. Each of catalysts 220 and 230 may convert received exhaust gases to converted exhaust gases as described herein.

Engine control unit 215 may control engine 210 and any components of engine 210, including components such as a stepper motor or a fuel control valve that controls the air-fuel ratio of air and fuel being used by engine 210. Engine control unit 215 may also control mid-bed air injection component 250 (discussed in more detail herein) and/or an actuator of mid-bed air injection component 250 in order to control the injection of air into catalyst system 211, and may receive data from mid-bed air injection component 250, such as flow rate, temperature, and pressure data. In some embodiments, mid-bed air injection component 250 may obtain or determine such data by communicating, or otherwise operating in conjunction, with thermocouples and/or delta pressure sensors configured in catalyst system 211. Alternatively, engine control unit 215 may obtain or determine flow rate, temperature, and pressure data for catalyst system 211 or exhaust gases directed thereto by operating directly with thermocouples and/or delta pressure sensors configured in catalyst system 211, or by using any other means that may provide or determine such data. Engine control unit 215 may determine, acquire, or otherwise obtain and transmit or otherwise provide data such as flow rate, temperature, and pressure data for catalyst system 211 or exhaust gases directed thereto to controller 280 or components thereof (discussed in more detail below). All such embodiments are contemplated as within the scope of the present disclosure.

In an embodiment, engine 210 is a rich burn engine exhausting gases into three-way catalyst 220. In this embodiment, three-way catalyst 220 may be a non-selective catalytic reduction (NSCR) subsystem, commonly referred to as a three-way catalyst. Three-way catalyst 220 may reduce CO and hydrocarbon emissions using an oxidation process, while also reducing NOx emissions using a reduction process.

Gases exhausted into three-way catalyst 220 by engine 210 may include NOx, carbon monoxide, and ammonia. Three-way catalyst 220 may convert some or all of the NOx that enters three-way catalyst 220 into ammonia. These generated compounds may be converted to other compounds using additional catalyst system components, as described herein. While some exhaust components entering three-way catalyst 220, such as carbon monoxide and ammonia, may be converted into other compounds by three-way catalyst 220, at least some of these compounds may not be converted to another compound by three-way catalyst 220 and may be exhausted from three-way catalyst 220 into ammonia slip catalyst 230.

Ammonia slip catalyst 230 may be an ammonia slip catalyst that may address ammonia that is emitted from three-way catalyst 220 unreacted. In an embodiment, ammonia slip catalyst 230 may be a dual layer catalyst with low precious metal loading and/or a zeolite coating. In such embodiments, a dual layer catalyst may be configured with two catalysts, each performing different functions. Each of the catalysts may be coated or otherwise configured on the same substrate. For example, in an embodiment, ammonia slip catalyst 230 may have a precious metal loading and a zeolite coating on a same substrate. The precious metal loading used in ammonia slip catalyst 230 may be a lower loading than a typical diesel oxidation catalyst and/or a typical three-way catalyst Ammonia slip catalyst 230 may oxidize the ammonia and carbon monoxide received from three-way catalyst 220 to dinitrogen ($N_2$, commonly referred to as simply "nitrogen") and carbon dioxide ($CO_2$), respectively. In an embodiment, air may be added into the exhaust flow between three-way catalyst 220 and ammonia slip catalyst 230 by injecting air into the flow with mid-bed air injection component 250. This added air may improve and/or assist in the oxidation processes performed at ammonia slip catalyst 230. Mid-bed air injection component 250 may be any means, component, device, or combination thereof capable of introducing additional air into the exhaust stream, and all such embodiments are contemplated as within the scope of the present disclosure.

Catalyst system 211 may be configured with controller 280 having at least two components, estimator 260 and control algorithm 270. Note that estimator 260 and control algorithm 270 may be combined, for example, as portions of a single software module or component, or may be separately implemented in separate software and/or hardware components. Controller 280 may be any type and any number of computing devices, software modules, or any combination thereof, and may be implemented by a device dedicated to performing the functions of a controller as described herein or by a device that performs other additional functions. All such embodiments are contemplated as within the scope of the present disclosure.

Estimator 260 may receive, using any means, including wireless communications, wired communications, or any combination thereof, measurements of particular gases or other substances from various sensors that may be configured at various points in catalyst system 211. Estimator 260 may also receive other data, such as flow rate, temperature, and pressure data for catalyst system 211 or exhaust gases directed thereto, from other components of system 100, such as engine control unit 215. Estimator 260 may exercise models of catalysts to determine estimates of catalyst system states and gas contents that are not directly measured. For example, estimator 260 may exercise a model of a three-way catalyst and an ammonia slip catalyst configured similar to the particular configuration of three-way catalyst 220 and ammonia slip catalyst 230 to determine estimates of gases such as CO, $NH_3$, and $O_2$ at points in catalyst system 211 where direct measurements are not made, such as at the point where gases are ultimately exhausted from ammonia slip catalyst 230. In another example, estimator 260 may estimate key species (e.g., CO, NOx, $NH_3$ and $CH_4$) concentrations at various points in catalyst system 111 (e.g., before gasses enter three-way catalyst 220) based on data received from engine control unit 115 using maps and/or correlations.

Estimator 260 may provide such estimates to control algorithm 270 that may then determine adjustments for components of catalyst system 211 and/or engine 210. For example, control algorithm 270 may determine an adjustment for the air-fuel ratio to be used at engine 210 and/or an adjustment of air injection to be used at mid-bed air injection component 250. Any adjustments or instructions to perform adjustments, or current determined settings, may then be transmitted or otherwise provided to engine control unit 215 for application to engine 210.

$O_2$ sensor 261 may be configured to detect and/or determine measurements of $O_2$ from exhaust gases entering three-way catalyst 220. $O_2$ sensor 261 may be configured to provide or otherwise transmit this data, directly or indirectly, to controller 280 and/or estimator 260. $O_2$ sensor 262 may be configured to detect and/or determine measurements of $O_2$ from exhaust gases exiting three-way catalyst 220 and before air is injected into such gases by mid-bed air injection component 250. $O_2$ sensor 262 may be configured to transmit such measurements to estimator 260.

Estimator 260 may obtain other operating condition data, such as flow rate, temperature, and pressure data, from engine control unit 215, indirectly or directly from mid-bed air injection component 250, and/or indirectly or directly from other components of engine 210 and/or catalyst system 211, such as thermocouples and delta pressure sensors. Estimator 260 may take the measurements received from $O_2$ sensor 261 and $O_2$ sensor 262 in combination with any other operating condition data and estimate, by exercising models representing similar catalysts, the quantity and/or concentration of CO and/or $NH_3$ in the gases entering three-way catalyst 220, the storage of $O_2$ in three-way catalyst 220, the storage of $NH_3$ in ammonia slip catalyst 230, the quantity and/or concentration of CO and/or $NH_3$ in the gases between three-way catalyst 220 and ammonia slip catalyst 230 but upstream of air injected by mid-bed air injection component 250, the quantity and/or concentration of CO, $NH_3$, and/or $O_2$ in the gases exiting three-way catalyst 220 and downstream of air injected by mid-bed air injection component 250, and/or the quantity and/or concentration of CO, $NH_3$, and/or $O_2$ in the gases exiting ammonia slip catalyst 230. Estimator 260 may also, or instead, estimate the storage of any gases or substances within any catalyst and/or estimate the quantities and/or concentrations of any other gases or any other substances that may be present anywhere in catalyst system 211, regardless of whether such gases or substances are directly measured by sensors or using any other means. All such embodiments are contemplated as within the scope of the present disclosure.

Estimator 260 may provide the estimated values based on sensor data received from $O_2$ sensor 261 and $O_2$ sensor 262 to control algorithm 270 that may then determine whether adjustments are needed to improve the operation of catalyst system 211 and/or engine 210, and/or determine the proper current operating settings for components of catalyst system 211 and/or engine 210. For example, control algorithm 270 may determine a proper current setting for a stepper motor or a fuel control valve that controls the air-fuel ratio for engine 210 based on the estimates provided by estimator 260. Controller 280 may transmit this setting to engine control unit 215 so that engine control unit 215 can adjust a stepper motor of engine 210. Alternatively, controller 280 may transmit this setting directly to the stepper motor or the fuel control valve of engine 210 or transmit a command that will cause the stepper motor of engine 210 to operate at the determined setting. Similarly, control algorithm 270 may determine a proper current setting for an actuator of mid-bed air injection component 250 based on the estimates provided by estimator 260. Controller 280 may transmit this setting to engine control unit 215 so that engine control unit 215 can adjust the actuator of mid-bed air injection component 250. Alternatively, controller 280 may transmit this setting directly to the actuator of mid-bed air injection component 250 or transmit a command that will cause the actuator of mid-bed air injection component 250 to operate at the determined setting. Any other adjustments or settings of any other components or engine 210 and/or catalyst system 211, or any other commands to implement such adjustments or settings, are contemplated as within the scope of the present disclosure.

Figure 3:
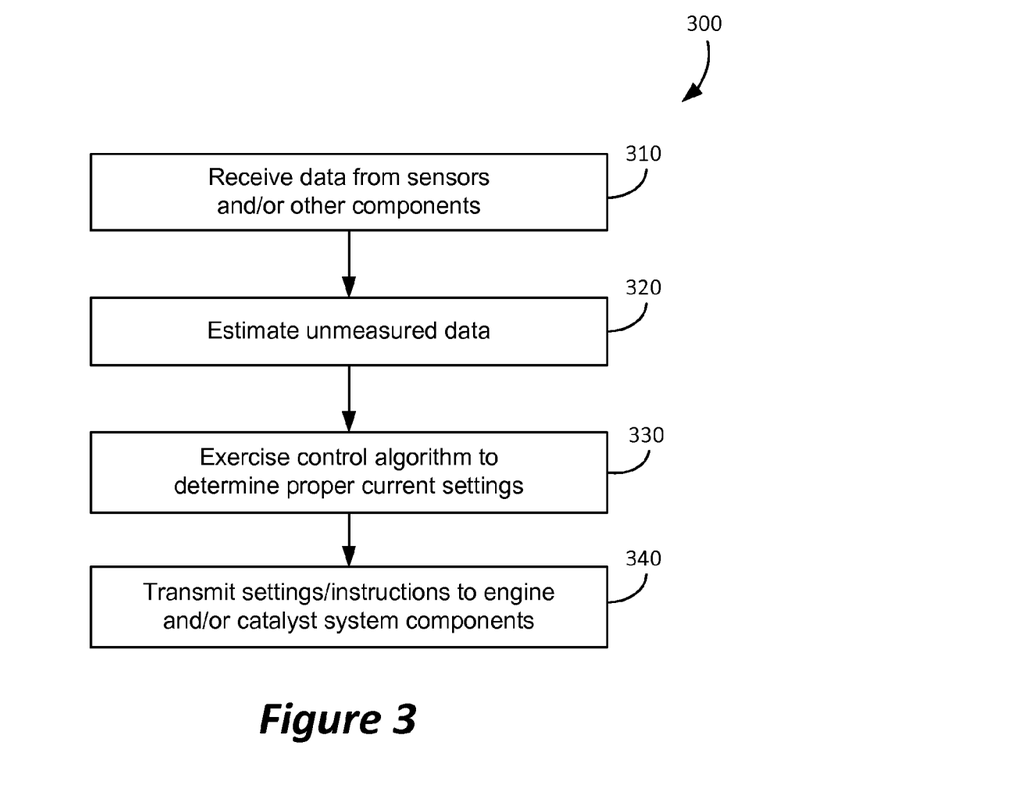
FIG. 3 is a flowchart illustrating a method of implementing a non-limiting exemplary rich-burn engine and catalyst system.

FIG. 3 illustrates exemplary, non-limiting method 300 of implementing an embodiment as disclosed herein. Method 300, and the individual actions and functions described in method 300, may be performed by any one or more devices or components, including those described herein, such as controller 180 of FIG. 1 and controller 280 of FIG. 2, and/or any other component or device of the systems illustrated in FIGS. 1 and 2. In an embodiment, method 300 may be performed by any other devices, components, or combinations thereof, in some embodiments in conjunction with other systems, devices and/or components. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 310, data may be received from sensors configured in a catalyst system and/or from any other component of an engine or catalyst system. For example, at block 310, in a catalyst system having a three-way catalyst configured upstream from an ammonia slip catalyst, an $O_2$ sensor located upstream from the three-way catalyst (e.g., $O_2$ sensor 161 and $O_2$ sensor 261) may transmit sensor data such as $O_2$ quantity and/or concentration. In such a system, a NOx sensor may be located downstream from the ammonia slip catalyst and may transmit sensor data such as NOx quantity and/or concentration of the exhaust traveling past the sensor at that location in the catalyst system. Other data may also be received from other components. For example, flow rate, temperature, and pressure data for a catalyst system or exhaust gases directed thereto may be received from an engine control unit (e.g., engine control unit 115 and engine control unit 215). Such data may be received at a controller or computing device such as any of those described herein.

At block 320, estimates may be made for unmeasured data. For example, estimates of data associated with gases such as CO, $NH_3$, and $O_2$ at points in a catalyst system where direct measurements are not made, such as at a point between two catalysts or where exhaust gases initially enter a catalyst system. Such data may include estimates of key species (e.g., CO, NOx, $NH_3$ and $CH_4$) concentrations at various points in a catalyst system 111 made based on data received from an engine control unit by using maps and/or correlations.

At block 330, a control algorithm may be exercised to determine proper current settings for components that may be adjusted by a controller in order to improve or maintain proper operating conditions for an engine and/or catalyst system. For example, the algorithm may determine, based on estimated data and/or actual measured data, that the air-fuel ratio of an engine and/or the air injection rate of a mid-bed air injection component may be adjusted to improve the emissions of an engine and catalyst system.

At block 340, settings and/or instructions to adjust or maintain settings may be transmitted to the appropriate component. For example, where components are configured to receive settings directly, a controller that determines a proper setting for a component may transmit the setting to the component. Alternatively, for components that are configured to receive instructions, a controller may be configured to transmit instructions to adjust or maintain the setting to the component.

For example, a controller may determine a current setting for a stepper motor that controls the air-fuel ratio for an engine based on the estimates generated and may transmit this setting to the stepper motor of the engine or transmit a command that will cause the stepper motor of the engine to operate at the determined setting. Similarly, a controller may determine a current setting for an actuator of a mid-bed air injection component based on the estimates generated and may transmit this setting to the actuator of the mid-bed air injection component or transmit a command that will cause the actuator of the mid-bed air injection component to operate at the determined setting. Note that in some embodiments, an additional determination may be made that no adjustment is needed, and therefore no instruction or setting may be transmitted.

The technical effect of the systems and methods set forth herein is the ability to meet all emissions regulations and achieve precise control of emissions using estimation and control algorithms with a minimum number of sensors, thereby reducing the cost and complexity of a catalyst system in use with a rich-burn engine. As will be appreciated by those skilled in the art, the use of the disclosed processes and systems may reduce the emissions of such engines while enabling them to run richly and be more reliable, cleaner, and less expensive. Those skilled in the art will recognize that the disclosed catalyst systems and methods may be combined with other systems and technologies in order to achieve even greater emissions control and engine performance. All such embodiments are contemplated as within the scope of the present disclosure.

Figure 4:
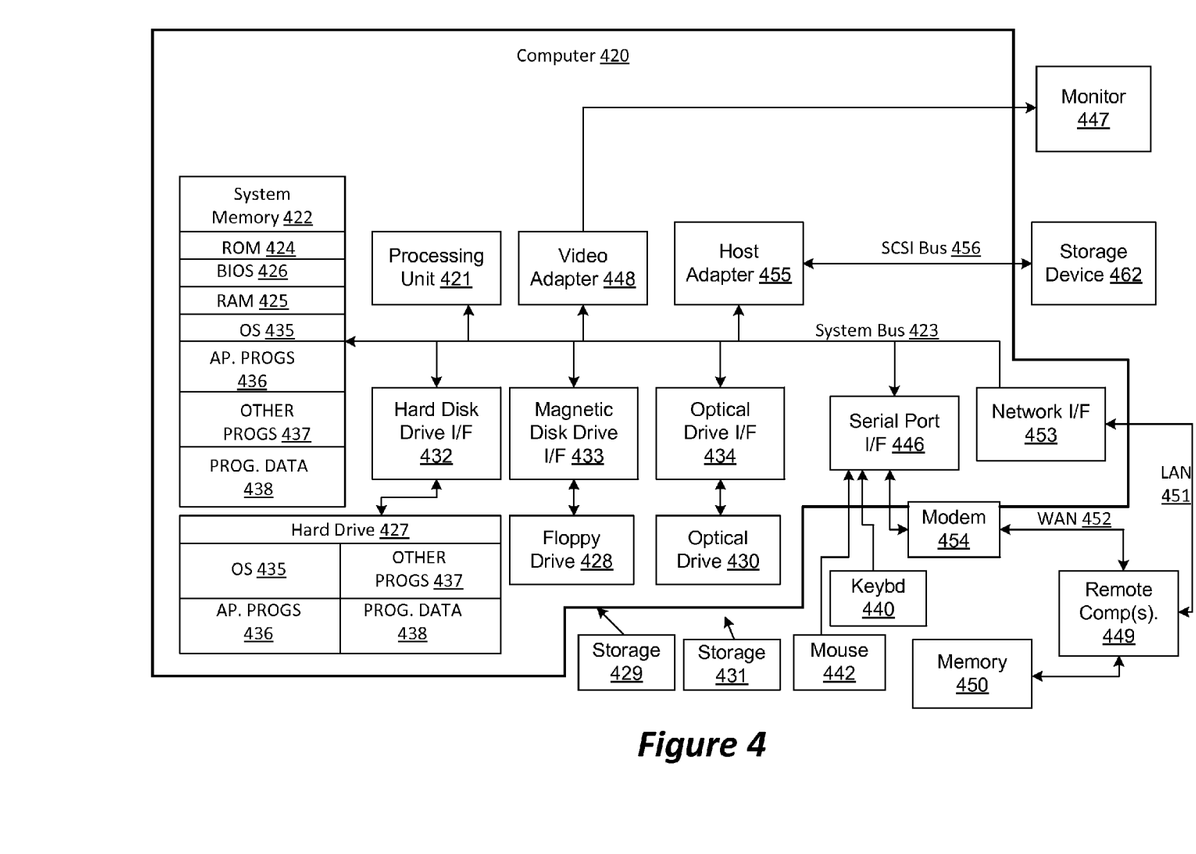
FIG. 4 is an exemplary block diagram representing a general purpose computer system in which aspects of the methods and systems disclosed herein may be incorporated.

FIG. 4 and the following discussion are intended to provide a brief general description of a suitable computing environment in which the methods and systems disclosed herein and/or portions thereof may be implemented. For example, the functions of controllers 180 and 280 may be performed by one or more devices that include some or all of the aspects described in regard to FIG. 4. Some or all of the devices described in FIG. 4 that may be used to perform functions of the claimed embodiments may be configured in a controller that may be embedded into a system such as those described with regard to FIGS. 1 and 2. Alternatively, some or all of the devices described in FIG. 4 may be included in any device, combination of devices, or any system that performs any aspect of a disclosed embodiment.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 4 is a block diagram representing a general purpose computer system in which aspects of the methods and systems disclosed herein and/or portions thereof may be incorporated. As shown, the exemplary general purpose computing system includes computer 420 or the like, including processing unit 421, system memory 422, and system bus 423 that couples various system components including the system memory to processing unit 421. System bus 423 may be any of several types of bus structures including a memory bus or memory controller, a peripheral bus, and a local bus using any of a variety of bus architectures. The system memory may include read-only memory (ROM) 424 and random access memory (RAM) 425. Basic input/output system 426 (BIOS), which may contain the basic routines that help to transfer information between elements within computer 420, such as during start-up, may be stored in ROM 424.

Computer 420 may further include hard disk drive 427 for reading from and writing to a hard disk (not shown), magnetic disk drive 428 for reading from or writing to removable magnetic disk 429, and/or optical disk drive 430 for reading from or writing to removable optical disk 431 such as a CD-ROM or other optical media. Hard disk drive 427, magnetic disk drive 428, and optical disk drive 430 may be connected to system bus 423 by hard disk drive interface 432, magnetic disk drive interface 433, and optical drive interface 434, respectively. The drives and their associated computer-readable media provide non-volatile storage of computer-readable instructions, data structures, program modules and other data for computer 420.

Although the exemplary environment described herein employs a hard disk, removable magnetic disk 429, and removable optical disk 431, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 427, magnetic disk 429, optical disk 431, ROM 424, and/or RAM 425, including an operating system 435, one or more application programs 436, other program modules 437 and program data 438. A user may enter commands and information into the computer 420 through input devices such as a keyboard 440 and pointing device 442. Other input devices (not shown) may include a microphone, joystick, game pad, satellite disk, scanner, or the like. These and other input devices are often connected to the processing unit 421 through a serial port interface 446 that is coupled to the system bus, but may be connected by other interfaces, such as a parallel port, game port, or universal serial bus (USB). A monitor 447 or other type of display device may also be connected to the system bus 423 via an interface, such as a video adapter 448. In addition to the monitor 447, a computer may include other peripheral output devices (not shown), such as speakers and printers. The exemplary system of FIG. 4 may also include host adapter 455, Small Computer System Interface (SCSI) bus 456, and external storage device 462 that may be connected to the SCSI bus 456.

The computer 420 may operate in a networked environment using logical and/or physical connections to one or more remote computers or devices, such as remote computer 449, air-fuel regulators of engine 110 and 210, and actuators of mid-bed air injection components 150 and 250. Each of air-fuel regulators of engine 110 and 210 and actuators of mid-bed air injection components 150 and 250 may be any device as described herein capable of performing the regulation of air and/or fuel entering an engine and the regulation of air being injected into a catalyst system, respectively. Remote computer 449 may be a personal computer, a server, a router, a network PC, a peer device or other common network node, and may include many or all of the elements described above relative to the computer 420, although only a memory storage device 450 has been illustrated in FIG. 4. The logical connections depicted in FIG. 4 may include local area network (LAN) 451 and wide area network (WAN) 452. Such networking environments are commonplace in offices, enterprise-wide computer networks, intranets, and the Internet.

When used in a LAN networking environment, computer 420 may be connected to LAN 451 through network interface or adapter 453. When used in a WAN networking environment, computer 420 may include modem 454 or other means for establishing communications over wide area network 452, such as the Internet. Modem 454, which may be internal or external, may be connected to system bus 423 via serial port interface 446. In a networked environment, program modules depicted relative to computer 420, or portions thereof, may be stored in a remote memory storage device. It will be appreciated that the network connections shown are exemplary, and other means of establishing a communications link between computers may be used.

Computer 420 may include a variety of computer-readable storage media. Computer-readable storage media can be any available tangible, non-transitory, or non-propagating media that can be accessed by computer 420 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computer 420. Combinations of any of the above should also be included within the scope of computer-readable media that may be used to store source code for implementing the methods and systems described herein. Any combination of the features or elements disclosed herein may be used in one or more embodiments.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a three-way catalyst that receives first exhaust gases from an engine;
   an ammonia slip catalyst that receives second exhaust gases from the three-way catalyst;
   an air injection component configured between the three-way catalyst and the ammonia slip catalyst;
   a first sensor that determines first exhaust gases data and transmits the first exhaust gases data to a controller;
   a second sensor that determines second exhaust gases data and transmits the second exhaust gases data to the controller; and
   the controller that estimates unmeasured exhaust gases data based on the first exhaust gases data and the second exhaust gases data and determines a setting of at least one of a component of the system or a component of the engine based on the unmeasured exhaust gases data.

2. The system of claim 1, wherein the first sensor determines the first exhaust gases data based on sensing the first exhaust gases, and
   wherein the second sensor determines the second exhaust gases data based on sensing third exhaust gases exiting the ammonia slip catalyst.

3. The system of claim 1, wherein the first sensor determines the first exhaust gases data based on sensing the first exhaust gases, and
   wherein the second sensor determines the second exhaust gases data based on sensing the second exhaust gases.

4. The system of claim 1, wherein the second sensor is configured upstream from the air injection component.

5. The system of claim 1, wherein the setting comprises an air-fuel regulation setting.

6. The system of claim 1, wherein the setting comprises an air injection component setting.

7. The system of claim 1, wherein the setting comprises an air injection component setting, wherein the controller determines a second setting based on the unmeasured exhaust gases data, and wherein the second setting comprises an air-fuel regulation component setting.

8. A method comprising:
   receiving first exhaust gases from an engine at a three-way catalyst;
   receiving second exhaust gases from the three-way catalyst at an ammonia slip catalyst;
   determining first exhaust gases data at a first sensor;
   transmitting the first exhaust gases data from the first sensor to a controller;
   determining second exhaust gases data at a second sensor;
   transmitting the second exhaust gases data from the second sensor to the controller; and
   estimating, at the controller, unmeasured exhaust gases data based on the first exhaust gases data and the second exhaust gases data; and
   determining, at the controller, a setting of at least one of a catalyst system component or an engine component based on the unmeasured exhaust gases data.

9. The method of claim 8, wherein determining the first exhaust gases data at the first sensor comprises determining the first exhaust gases data at the first sensor based on the first exhaust gases, and
   wherein determining the second exhaust gases data at the second sensor comprises determining the second exhaust gases data at the second sensor based on sensing third exhaust gases exiting the ammonia slip catalyst.

10. The method of claim 8, wherein determining the first exhaust gases data at the first sensor comprises determining the first exhaust gases data at the first sensor based on the first exhaust gases, and
    wherein determining the second exhaust gases data at the second sensor comprises determining the second exhaust gases data at the second sensor based on sensing the second exhaust gases.

11. The method of claim 8, wherein the second sensor is configured downstream from the three-way catalyst and upstream from an air injection component configured between the three-way catalyst and the ammonia slip catalyst.

12. The method of claim 8, wherein the setting comprises an air-fuel regulation component setting.

13. The method of claim 8, wherein the setting comprises an air injection component setting.

14. The method of claim 8, wherein the setting comprises an air injection component setting, further comprising determining a second setting based on the unmeasured exhaust gases data, wherein the second setting comprises an air-fuel regulation component setting.

15. An engine comprising:
    an internal combustion component that generates first exhaust gases;
    a three-way catalyst that receives the first exhaust gases from the internal combustion component;
    an ammonia slip catalyst that receives second exhaust gases from the three-way catalyst;
    an air injection component configured between the three-way catalyst and the ammonia slip catalyst;
    a first sensor that determines first exhaust gases data and transmits the first exhaust gases data to a controller;
    a second sensor that determines second exhaust gases data and transmits the second exhaust gases data to the controller; and
    the controller that estimates unmeasured exhaust gases data based on the first exhaust gases data and the second exhaust gases data and determines a setting of an engine component based on the unmeasured exhaust gases data.

16. The engine of claim 15, wherein the first sensor determines the first exhaust gases data based on sensing the first exhaust gases, and
    wherein the second sensor determines the second exhaust gases data based on sensing third exhaust gases exiting the ammonia slip catalyst.

17. The engine of claim 15, wherein the first sensor determines the first exhaust gases data based on sensing the first exhaust gases, and
    wherein the second sensor determines the second exhaust gases data based on sensing the second exhaust gases.

18. The engine of claim 15, wherein the second sensor is configured upstream from the air injection component.

19. The engine of claim 15, wherein the setting comprises an air-fuel regulation setting.

20. The engine of claim 15, wherein the setting comprises an air injection component setting.

\* \* \* \* \*